Dec. 31, 1940.  G. D. WATKINS  2,226,647
WATER AND GAS TIGHT LIGHT
Filed April 4, 1938   3 Sheets-Sheet 1

Glen D Watkins
INVENTOR
BY R. M. Thomas
ATTORNEY

Dec. 31, 1940.   G. D. WATKINS   2,226,647
WATER AND GAS TIGHT LIGHT
Filed April 4, 1938   3 Sheets-Sheet 2
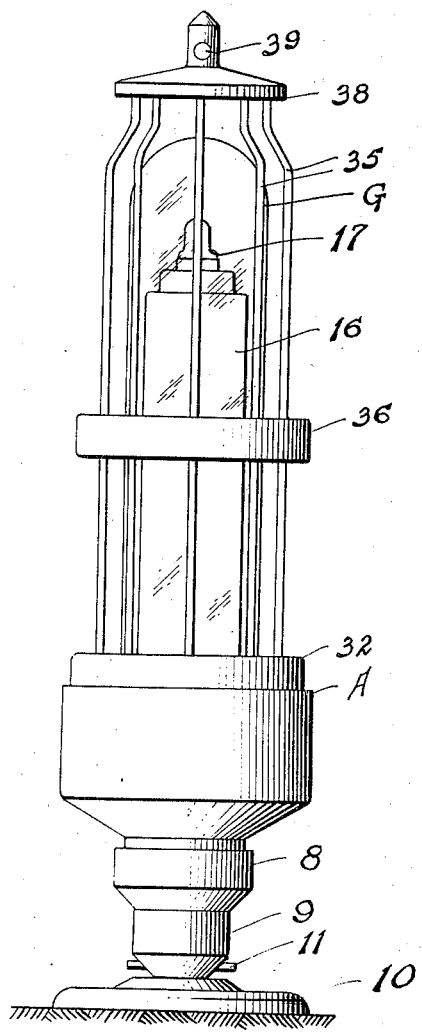
FIG. 4
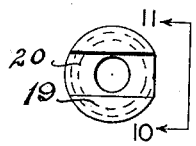
FIG. 5
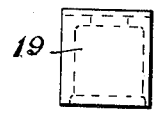
FIG. 6
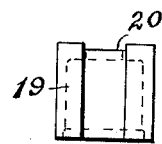
FIG. 7
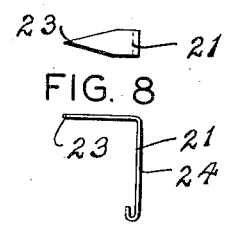
FIG. 8
FIG. 9
Glen D Watkins
INVENTOR
BY R. M. Thomas
ATTORNEY Dec. 31, 1940.　　　　　G. D. WATKINS　　　　　2,226,647
WATER AND GAS TIGHT LIGHT
Filed April 4, 1938　　　3 Sheets-Sheet 3

Glen D Watkins
INVENTOR
BY R. M. Thomas
ATTORNEY

Patented Dec. 31, 1940

2,226,647

UNITED STATES PATENT OFFICE 2,226,647

WATER AND GAS TIGHT LIGHT

Glen D. Watkins, Ogden, Utah

Application April 4, 1938, Serial No. 199,938

4 Claims. (Cl. 240—11.3)

My invention relates to improvements in dry cell flashlights and has for its object to provide a new and highly efficient safety flash light which has many uses and features, the major ones being, that the light is both gas and water tight and may be operated with perfect safety where explosive gases or powders are being used.

A further object is to provide a light which may be used by fishermen to lower into the water during night fishing to attract the fish to his lures.

A still further object is to provide a light sealed in itself against water or gas and which light may be self illuminated by gravity or may be turned on manually. In other words, the light may be used on a long rope, cord, or cable, and lowered into water, or other liquids or into a gas filled mine or like places and upon reaching the bottom the weight of the light turns it on and when raised from the bottom it is instantly turned off. Further, it should be stressed, that this light has its switching mechanism within the light and so situated that there cannot be any chance of spark or danger from the throw of the switch and which switch is so constructed that the outside of the light frame is never a conductor of electrical energy never being grounded to the outside frame.

A still further object is to provide a light which may be used as a road flare by police, trucksters, and the like, and which will not go out in any kind of weather and which is self supporting, being provided with either a penetrating point or a flat standard or base.

These and many other objects I accomplish with the device illustrated in the accompanying drawings in which similar numerals and letters of reference indicate like parts throughout the several views and as described in the specification forming a part of this application and pointed out in the appended claims.

In the drawings:

Figure 4 is an outside elevation of the entire light.

Figure 5 is a plan view of the contact holding fiber cylinder.

Figure 6 is a side elevation of Figure 5.

Figure 7 is a side elevation of Figure 5 shown as from line 10—11.

Figure 8 is an end view of the contact for completing the circuit.

Figure 9 is a side elevation of Figure 8.

Figure 1:
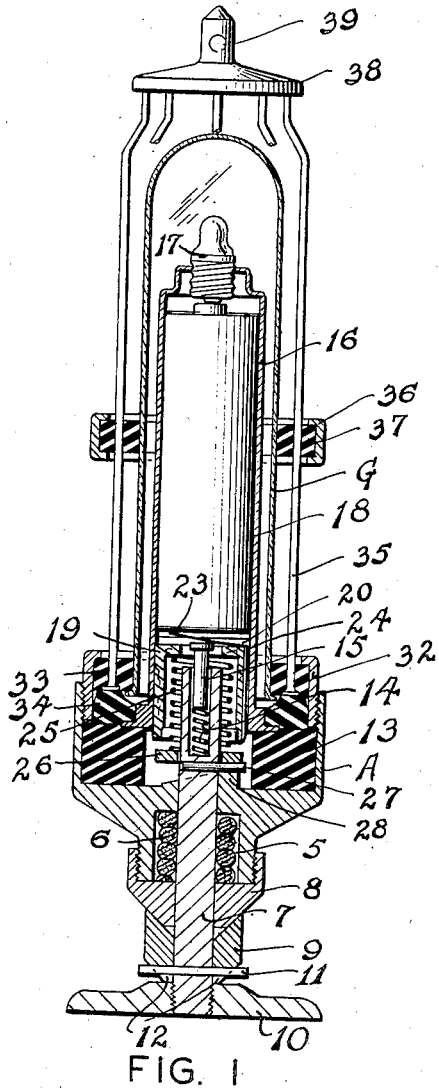
Figure 1 is a diametrical vertical section of the entire light, with the control switch in the "on" position for illuminating the globe.
Figure 3:
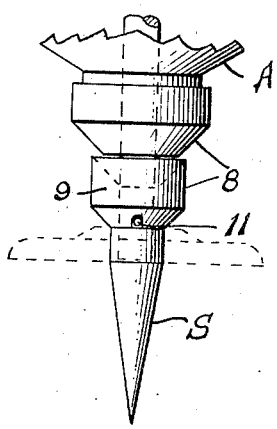
Figure 3 is a side elevation of the base of the light with flat standards or base removed and a penetrating point replacing it to permit standing the light by penetrating the point in any surface soft enough to receive the point.

In the drawings, I have shown the flash light as made with a cylindrical base A, which is internally threaded at the top end and which has the lower end tapered to a threaded packing gland 5. This gland carries a packing wick 6 and is centrally bored to receive the control switch shaft 7. This shaft extends down through the packing nut 8, through a safety switch ring 9, with the lower end of the shaft threaded to receive a flat bottomed standard or base 10, on which the entire light may be set or if desired, this disk may be removed and the pointed metal spike S shown in Figure 3 may be screwed into the end of the shaft 7 to provide other means of supporting the light. This spike is strong enough to penetrate wood if desired or expedient to set the light in a wall or tree. Transversely through the shaft 7 near the bottom end thereof but above the threaded end there is a hole bored to receive a small steel pin or shaft 11 which is adapted to either rest against the bottom of the ring 9 or be merged into diametrically opposed slots or recesses 12 this being the control device for the switch element of the flash light and its operation will be described hereafter.

Within the cylinder of the base A there is a flat hard rubber washer 13 to act as an insulator and base on which the balance of the light rests when assembled. This washer is provided with a bore large enough to encompass the switching element of the device and the switch is made on and controlled by the top of the shaft 7. The top end of the shaft 7 is made with a bore running down thereinto and in this bore there is a small spring 14 with a contact shaft or hard rubber pin 15 carried in the bore above the spring and which pin is a non-conductor of electrical energy. A metal tube 16 having the bottom end flanged outwardly to form a base is set upon the washer 13 and the top end of said tube is constructed with a central hole therein into which the globe 17 is screwed. Within the metal tube the battery 18 is placed with the bottom of the battery resting on the top end of a fiber cylinder 19.

This fiber cylinder 19 is formed as shown in Figures 5 to 7 of the drawings with one end partially closed with a central bore therethrough through which bore the top end of the pin 15 passes. Transversely across the top of the fiber cylinder, there is a recess 20 which recess also extends down one vertical side of the cylinder and within this recess is the contact 21 making an electrical connection between cylinder 16 and the bottom of the battery 18. This contact 21 is made as shown in Figures 8 and 9, the contact end being tapered to contact point 23 adapted to engage against the bottom end of the battery 18 and the body 24 of the contact is bent at right angles to the point 23 extending down the recess in the side of the cylinder 19 with the lower end of the contact bent upwardly in a hook to engage over the end of the cylinder and hold the contact in place when assembling the light. The pressure of the pin 15 on the underside of the contact point 23 forces the point to engage the bottom of the battery at the same time springing the side or body 24 outwardly to contact the side of the metal tube 16 to complete the circuit.

Figure 2:
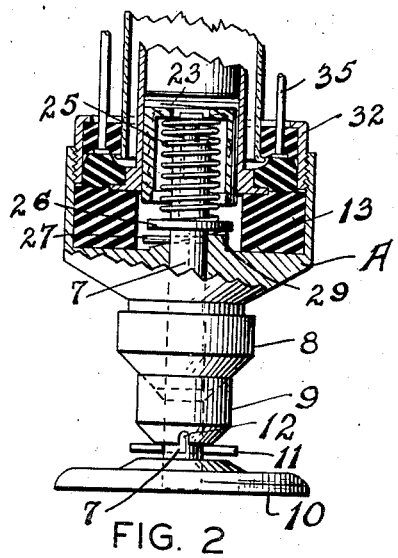
Figure 2 is a side elevation of the base of the light parts sectioned and other parts cut away to show the switch control in the "off" position.
Figure 10:
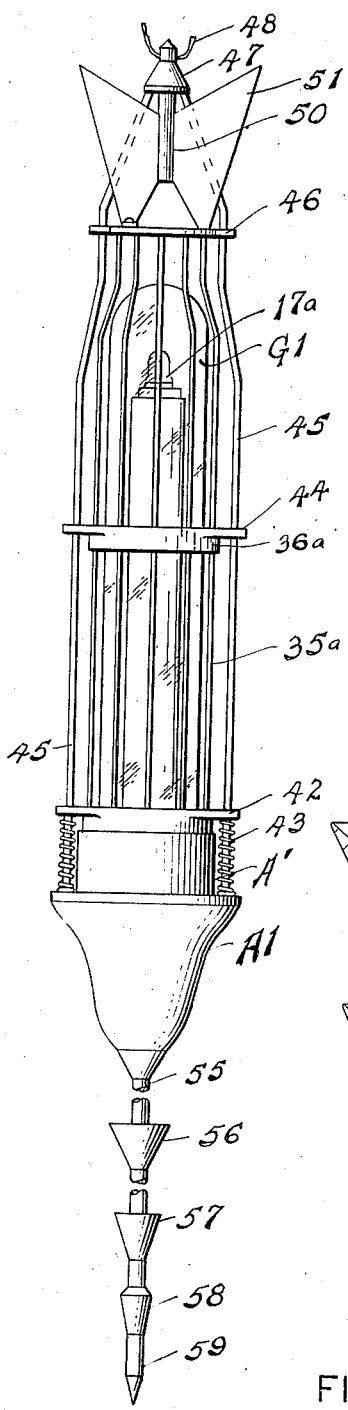
Figure 10 is a side elevation of one of my lights adapted for use as an aeroplane flare or landing light.
Figure 11:
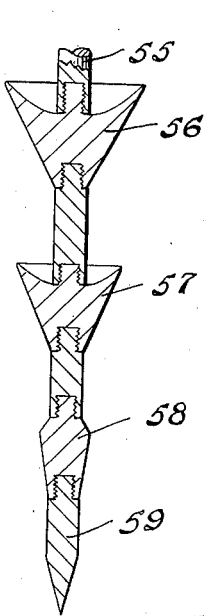
Figure 11 is a section diametrically through the bottom standard and shock absorbing spike for the flare.
Figure 12:
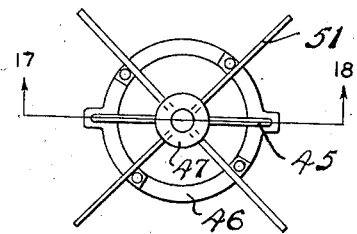
Figure 12 is a plan view of Figure 10.
Figure 13:
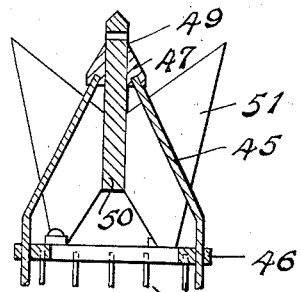
Figure 13 is a section on lines 17—18 of Figure 12.
Figure 14:
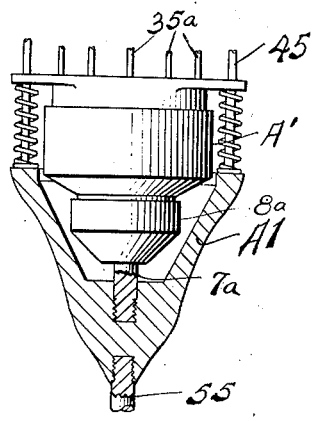
Figure 14 is a view of the base of the flare showing the protecting cone sectioned.

The contact is made by applying pressure to the bottom end of the shaft 7 or by resting the entire light upon the point 8 or the base 10. The switch may also be operated by rotating the base 10 and the shaft 7. This is accomplished by placing a coil spring 25 within the fiber cylinder 19 with the bottom end resting upon a washer 26. Transversely through the shaft 7 there is a pin 27 which extends out one side thereof and this pin rests upon an incline or cam 28 which cam is made an integral part of the base A concentrically around the bore in which the shaft 7 is carried with the apex of this cam provided with a transverse recess or notch 29 in which the pin 27 drops when the base 10 or shaft 7 is rotated. This locks the light in the "on" position for when the shaft 7 is rotated this raises the shaft by the action of the pin on the cam and the raising of the shaft forces the contact rubber pin 15 to engage the switch contact point 23 to the battery and the body to the side of the metal tube. Thus the light may be turned on manually by rotating the shaft 7 or it may be turned on by standing the light upon its base using its weight to contact the switch. In Figure 2 the switch is shown in the locked "off" position which is accomplished by withdrawing the shaft 7 as far as possible and then rotating the lock nut 8 until the shaft 11 rests on the flat bottom of the nut 9 and is not aligned with the recess 12.

Into the top of the internally threaded cylindrical base A the glass sealing globe G is placed and this globe is a cylindrical body with the top end closed in a curve and with the open bottom flanged out to rest in a sponge rubber washer 34 which washer is carried within the cylinder A on top of the washer 13. This washer 34 rests upon the top side of the flanged base of the cylinder or metal tube 16 to make a water tight seal therebetween and the base of the globe G rests on the top side of this washer 34. Onto the top of the washer 34 I place a washer 33 of like form to seal the top side of the glass globe G so no water can enter the globe and this assembly of washers is held in water tight relationship by screwing the flanged cylinder 32 down thereonto. Vertically through the washer 33 there are guard rods 35 which extend beyond the top end of the globe G to all join into a cover or hood 38. The top end of the hood 38 carries a stub shaft or boss 39 thereon which is perforated to receive a ring or cord for lowering the light into dark inaccessible places or into water. As an aid to the guard rods to help them to protect the globe G and to hold the globe properly spaced and held in position, there is an annular rubber washer 37 provided; perforated and through which perforations the rods pass and surrounding this washer there is a flanged washer ring 36 holding the washer and rods in fixed position. This aids in guarding the globe and take up shock when the light is dropped.

The type of device shown in Figures 10 to 14 inclusive show the use of the light with the additional attachments thereon which will be necessary when the light is used to be dropped from an aeroplane as a landing or flare light. This is accomplished by placing a protective cone A1 of rigid material surrounding the cylindrical base shown in these figures as A'. The top end of the cylinder has the threaded locking member screwed thereinto and this is provided with ears 42 extended out two sides thereof through which two vertical shearing rods 45 are passed and operated. The lower end of the rods 45 between the ears 42 and the cone A1 is surrounded by a shock spring 43 to take part of the shock of landing from the device and insure the action of the rods 45. The rods pass up through ears 44 formed on the protecting guard ring 36a and the top ends of the rods are curved inwardly to pass through ears on a top ring 46. In this particular type of device, the rods 35a are set in this ring 46 instead of the cover 38 as shown in the other figures. The rods extend through the ears on the ring 46 and are bent inwardly to merge into a cutting cone 47. This cutting cone has its apex 49 sharpened to a cutting edge to shear off the parachute cord 48 when the flare has hit the ground to release the landing parachute from the flare so that it will not cover the flare or effect its lighting capacity. As a support for the cutting cone 47 and as a guide for the device when in the air, radial fins 51 are secured on a central shaft 50 and to the rim 36 for obvious reasons.

On to the bottom end of the cone A1 there is a central downwardly extended axially aligned rod 55 to which a cone 56 is screwed the cone 56 being to aid in stopping the penetration of the spike into the ground when the device has been thrown from a plane. Below the cone 56 there is a smaller cone 57 and spaced below that a still smaller cone 58 with the end spike 59 to penetrate the ground. Each of the cones is graduated in size in relation to each other with smaller cone down and the larger ones thereabove. These are to retard and stop the penetration of the spike into the ground.

It will also be obvious that a buoy or float might be placed around the cone A1 and the device used for ocean flights without effecting the light or in any way conflicting with the objects of this invention. Applicant feels that such alterations and changes are within the spirit of his invention and the scope of his claims.

I claim:

1. In a flashlight the combination of a base of cylindrical shape with its lower end formed into a packing gland; a cylindrical glass dome mounted in the top of said base; soft rubber washers above and below the base of said glass dome; means to seal said dome to said base with the washers affording a waterproof seal; a flashlight battery mounted in a cylindrical metal tube within said dome; a light in the top end of said tube; a fiber cylinder carried in the base of said tube under said battery; a contact carried in said fiber cylinder said contact adapted to engage the side of the tube and the bottom of the battery when pressed up from below; means to so press said contact when the light is set upon anything for support; and means to protect said glass dome from breakage.

2. In a self controlled light the combination of a metal tube; a battery carried in said tube; a light globe in the top end of said tube; a contact mounted in a fiber cylinder under said battery; a control shaft extending down below said contact; a base surrounding the bottom of said tube with said shaft extended through the bottom of said base, said shaft operating to make said contact engage said battery when the weight of the entire light is placed thereon; means on said shaft to support said shaft, base and the entire device; a cylindrical closed glass tube mounted surrounding said metal tube and light globe; means to seal the base and glass tube into a waterproof gasproof seal and means to pack said shaft to prevent water and gas from passing therearound.

3. A water tight and gas tight flash light comprising a metal tube; a battery in said tube; a light globe in the top of said tube; a contact in the bottom of said tube; a surrounding base for the bottom of said tube; a surrounding glass cylinder around the upper portion of said tube; means to seal the glass cylinder and base in a water tight and gas tight seal; a rotatable switch member carried in said base, said switch having an inclined ramp adapted to engage a spring held pin with said contact to light the globe; means to lock said switch member from operating; means extending through the bottom of said base to engage said spring held pin with said contact; and means to pack the bottom of said base against water and gas.

4. A water and gas tight flash light comprising, a metal tube; a battery in said tube; a light globe in the top of said tube; a contact in the bottom of said tube; a base for the bottom of said tube having a greater diameter than said tube; a surrounding glass dome carried in said base surrounding said tube and globe; means to seal the dome and base in a water and gas tight seal; a switch actuating and support member for said flash light mounted through the bottom of said base adapted to engage said contact to illuminate said light globe when the flash light is resting upon said member; spaced apart rods extending upwardly from said base surrounding said glass dome to protect it from breakage; and means at the top of said rods to join them together and to suspend said flash light therefrom when desired.

GLEN D. WATKINS.